(12) United States Patent
Griffith

(10) Patent No.: US 10,308,341 B2
(45) Date of Patent: Jun. 4, 2019

(54) GAS DENSITY CONTROL SYSTEM

(71) Applicant: John Oliver Griffith, Stockbridge, GA (US)

(72) Inventor: John Oliver Griffith, Stockbridge, GA (US)

( * ) Notice: Subject to any disclaimer, the term of this patent is extended or adjusted under 35 U.S.C. 154(b) by 304 days.

(21) Appl. No.: 15/417,925

(22) Filed: Jan. 27, 2017

(65) Prior Publication Data

US 2017/0233056 A1 Aug. 17, 2017

Related U.S. Application Data

(60) Provisional application No. 62/295,756, filed on Feb. 16, 2016.

(51) Int. Cl.
| | | |
|---|---|---|
| *B64B 1/62* | (2006.01) | |
| *B64B 1/64* | (2006.01) | |
| *B64B 1/06* | (2006.01) | |
| *B64B 1/60* | (2006.01) | |

(52) U.S. Cl.
CPC .................. *B64B 1/62* (2013.01); *B64B 1/06* (2013.01); *B64B 1/60* (2013.01); *B64B 1/64* (2013.01)

(58) Field of Classification Search
CPC .... B64B 1/60; B64B 1/62; B64B 1/64; B64B 1/58; B64B 1/06; B64B 1/18; B64B 1/26
See application file for complete search history.

(56) References Cited

U.S. PATENT DOCUMENTS

2015/0021427 A1* 1/2015 Heppe ...................... B64B 1/40
244/2

* cited by examiner

*Primary Examiner* — Richard R. Green
*Assistant Examiner* — Vicente Rodriguez
(74) *Attorney, Agent, or Firm* — Dunlap Bennett & Ludwig PLLC

(57) ABSTRACT

A gas density control system for airships is provide. The system embodies a hybrid ballonet and low pressure gas storage tank combination for regulating the density and volume of the airship lift gas, wherein the ballonet is fluidly connected to the storage tank by a transfer hose. The base of the ballonet is also sealed along an exterior surface of the length curvilinear geometric shaped storage tank so that as the storage tank selectively rotates the ballonet either wraps or unwraps around the length, whereby the lift gas transfer to and from the storage tank to the ballonet, respectively. A transfer hose reel is provided to rotate with the storage tank so that as the ballonet wraps about the storage tank the transfer hose winds about the transfer hose reel, and vice versa. Thereby the system precisely adjusts the ballonet's volume, which in turn controls its lifting force.

7 Claims, 4 Drawing Sheets

GAS DENSITY CONTROL SYSTEM

CROSS-REFERENCE TO RELATED APPLICATION

This application claims the benefit of priority of U.S. provisional application No. 62/295,756, filed 16 Feb. 2016, the contents of which are herein incorporated by reference.

BACKGROUND OF THE INVENTION

The present invention relates to lift gas control systems of airships and, more particularly, to a gas density control system embodying a ballonet and low pressure gas storage tank combination to regulate the density and volume of the airship lift gas.

A ballonet is a balloon inside an envelope of an airship. When the ballonet is filled with lighter-than-air lift gas the airship will achieve a lifting force. All modern airships are equipped with a lift gas volume or density control system to monitor and maintain the payload lifting capacity of the airships lighter-than-air gas envelope. Maintaining quick precise control of the lifting forces of the lighter-than-air gases within an airship's lifting gas envelope is critical to its safe operation in all flight modes. Currently available lift gas control systems are extremely complicated to operate because they require complex gas manifolds, high pressure tanks, pumps, and complex electronic control systems as well as time to manage the weight and balance of the lift gas and ballast.

As can be seen, there is a need for a gas density control system embodying a ballonet attached along a rotatable low pressure gas storage tank to regulate the density and volume of the airship lift gas through wrapping and unwrapping the ballonet about the rotating gas storage tank, selectively moving volumes of lift gas from storage to lift envelope or lift envelope to storage quickly and safely, while driven by the one motor. Thereby, the present invention safely trims and regulates the lifting capacity of the airship through all flight modes without the use of complicated gas manifolds and heavy pumps or high pressure valves, and without the necessity for dumping any valuable gases.

SUMMARY OF THE INVENTION

In one aspect of the present invention, gas density control system embodies a drive motor; a lift air storage tank rotatably connected to the drive motor; and a ballonet extending from a base and a top edge, wherein the base is connected along an exterior surface of a length of the lift air storage tank so that a major portion of the ballonet wraps or unwraps around the rotating lift air storage tank.

In another aspect of the present invention, the gas density control system embodying a drive motor; a curvilinear geometric shaped lift air storage tank rotatably connected to the drive motor; a ballonet extending from a base and a top edge, wherein the base is connected along an exterior surface of a length of the lift air storage tank so that a major portion of the ballonet wraps or unwraps around the rotating lift air storage tank; a transfer hose fluidly connecting the ballonet and the lift air storage tank; a hose reel rotatably connected to the drive motor, wherein the hose reel is adapted so that the transfer hose winds about the hose reel when the ballonet wraps around the rotating lift air storage tank; a chamber fluidly connecting to the transfer hose and the lift air storage tank; an impeller housed in the chamber; and a manual purge valve disposed along the top edge.

These and other features, aspects and advantages of the present invention will become better understood with reference to the following drawings, description and claims.

DETAILED DESCRIPTION OF THE INVENTION

Figure 1:
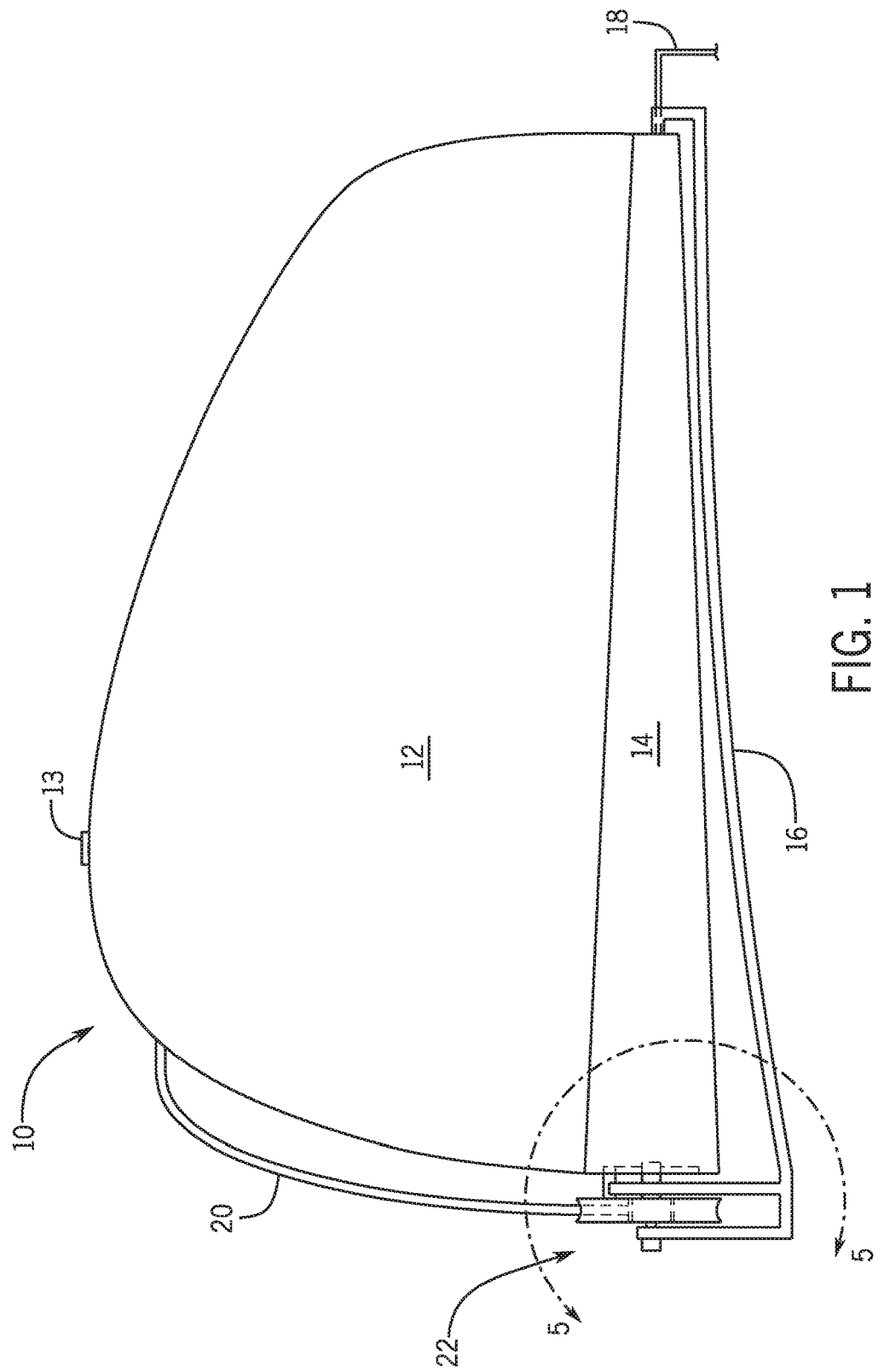
FIG. 1 is a side elevation view of an exemplary embodiment of the present invention.
Figure 2:
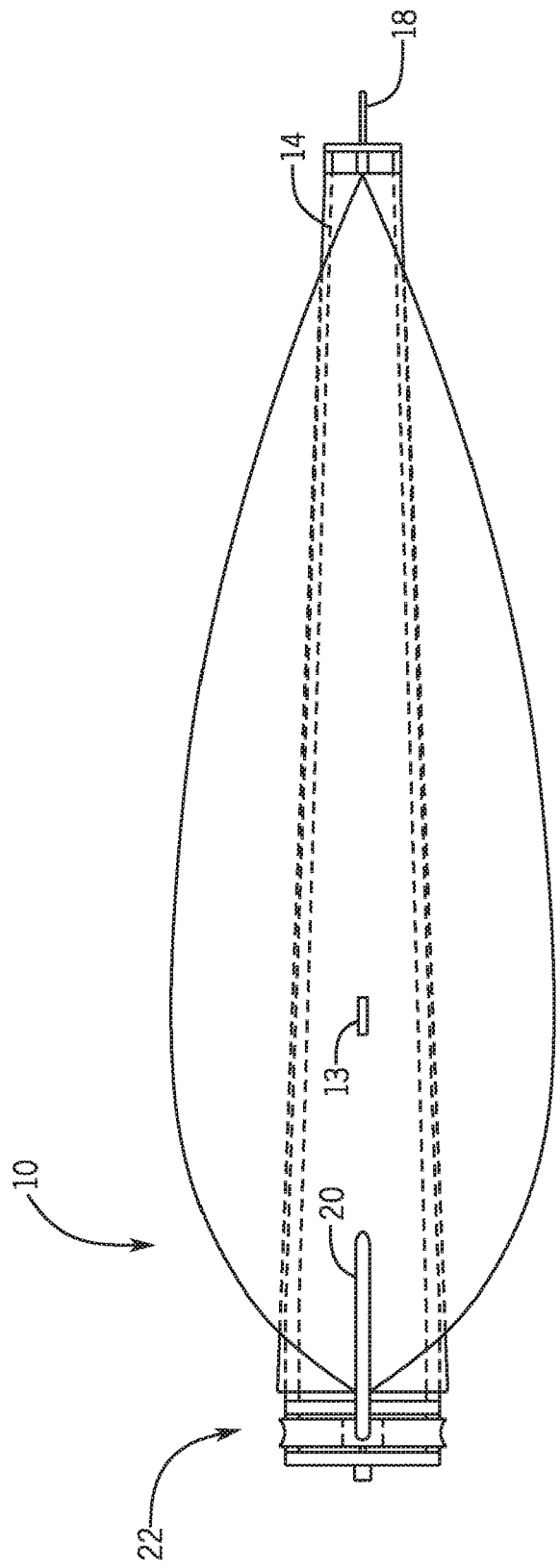
FIG. 2 is a top plan view of an exemplary embodiment of the present invention.
Figure 3:
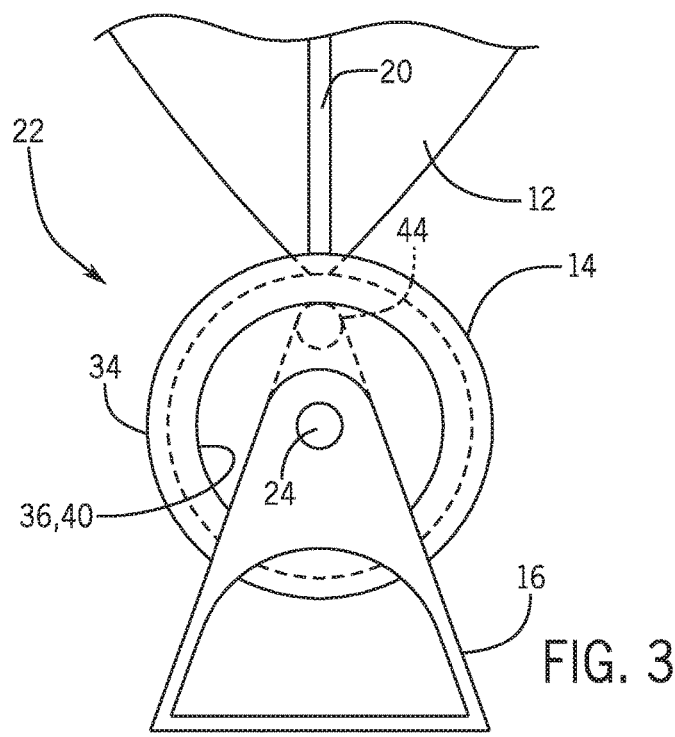
FIG. 3 is a front view of an exemplary embodiment of the present invention.
Figure 4:
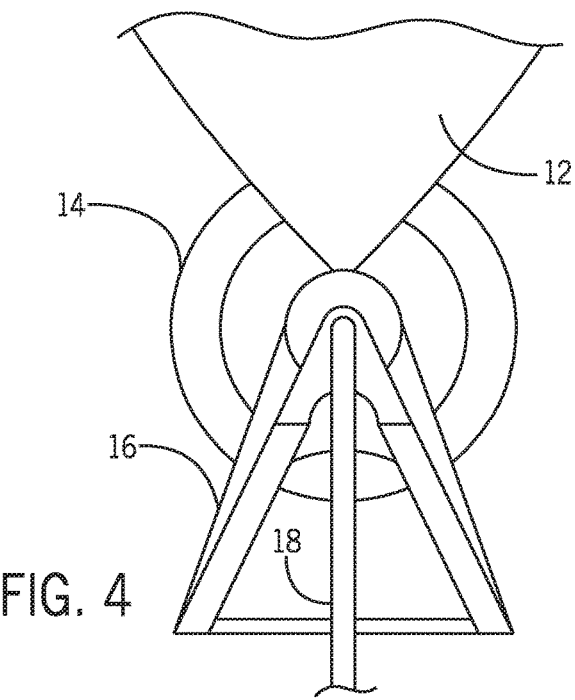
FIG. 4 is a rear elevation view of an exemplary embodiment of the present invention, demonstrating an operative effect.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a gas density control system providing a hybrid ballonet and low pressure gas storage tank combination to regulate the density and volume of the airship lift gas, wherein the ballonet is fluidly connected to the storage tank by a transfer hose. The base of the ballonet is also sealed along an exterior surface of the length curvilinear geometric shaped storage tank so that as the storage tank selectively rotates the ballonet either wraps or unwraps around said length, whereby the lift gas transfer to and from the storage tank to the ballonet, respectively. A transfer hose reel is attached to and driven by the same motor that rotates the storage tank so that as the ballonet wraps about the storage tank the transfer hose winds about the transfer hose reel, and when the ballonet unwraps the transfer hose unwinds. Thereby the gas density control system precisely adjusts the ballonet's volume, which in turn controls its lifting force.

Referring to FIGS. 1 through 5, the gas density control system 10 may include a gas density control system embodying a lifting gas ballonet 12 combined with a lifting gas storage tank 14. The storage tank 14 may be fluidly connected to the ballonet 12 by way of a lifting gas transfer hose 20. The ballonet 12 may be connected along a length of the storage tank 14 so that when the storage tank 14 rotates about a longitudinal axis, the ballonet 12 wraps or unwraps about the storage tank 14, while simultaneously the transfer hose 20 winds and unwinds, respectively, about a gas transfer hose storage reel 34. The gas transfer hose storage reel 34 is synchronized to rotate about the same longitudinal axis along with the storage tank 14 via a control unit 22. A frame 16 supports the control unit 22, the ballonet 12 and storage tank 14 combination. The storage tank 14 may be fluidly connected to an input/output line 18 for transferring lift gas therethrough.

Figure 5:
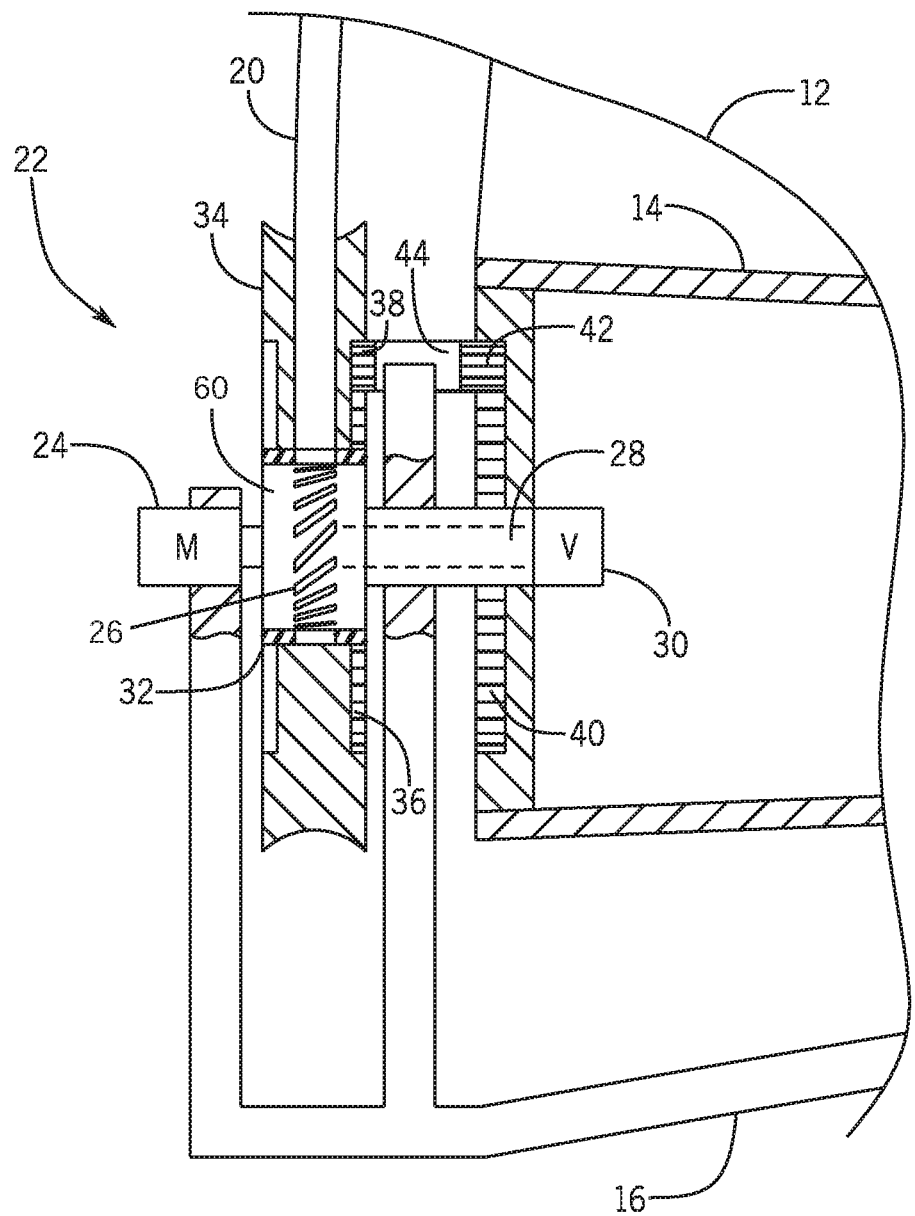
FIG. 5 is a detail side elevation view of an exemplary embodiment of the present invention, as indicated by line 5-5 in FIG. 1, with parts broken away.

The control unit 22 may include the gas transfer hose storage reel 34 providing a chamber 60 through which the transfer hose 20 fluidly connects to the storage tank 14. A seal 32 may be provided between said chamber 60 and storage reel 34. The chamber 60 may house an impeller 26 (such as a radial turbine gas impeller) driven by an impeller motor 24 (such as a brushless electric motor), wherein a conduit 28 fluidly connects the chamber 60 and the storage tank 14, as illustrated in FIG. 5. Between the storage tank 14 and the chamber 60 may be a valve 30.

A drive motor 44 may be disposed between the storage tank 14 and the gas transfer hose storage reel 34 so as to selectively engage both, so that their rotation about the same axis is synchronized. A storage tank gear track 40 and associated pinion tank gear 42, and a reel gear track 36 and associated pinion reel gear 38 on each end of a shaft of the drive motor may be provided to effectuate the synchronicity, as illustrated in FIG. 5.

Lift gas ballonet 12 includes a sealed gas tight balloon like envelope with only two opening where it connects to the gas transfer hose 20 and a ballonet manual purge valve 13. The base of the gas ballonet 12 may be secured to the exterior surface along the horizontal lift gas storage tank 14, the length, lateral profile and dimensions being such that when rotated on the longitudinal axis of the storage tank, the ballonet 12 will neatly form around the exterior surface of the lift gas storage tank 14. In certain embodiments, the base of the ballonet 12 may be firmly sealed to the carbon fiber gas storage tank's exterior along the tank's axis in a manner that allows a major portion of the ballonet to wrap, and unwrap around the rotating gas tank freely.

The hose reel 34 and storage tank 14 rotation drive motor 44 may have drive gears on each end of its motor shaft. This gearing allows the motor to interface with the tank gear 40/42 attached to the end of the lift gas storage tank and its twin, the hose reel gear 36/38. Rotation of the storage tank 14 and the transfer hose reel 34 retracts the transfer hose 20 as the ballonet lift gas is squeezed from the ballonet 12 through the transfer hose 20, through the gas impeller 26 that is driven by the impeller motor 24, through the open tank gate valve 30 and into the lift gas storage tank 14.

Rotation of gas storage tank 14 wraps the ballonet 12 around the gas storage tank 14. This action transfers the lift gas, under resulting pressure, from the ballonet 12 into the storage tank 14 that may contain a carbon fiber hydrogen storage matrix which allows the tank 14 to store large volumes of lift gas, such as hydrogen, at low pressure. The fabric of the ballonet 12 wrapped around the storage tank 14 also makes the tank 14 stronger. The storage of the lift gas inside the tank 14 reduces the volume and density of lifting gas in the airship envelope thus reducing the airship's payload lifting force. In certain embodiments, the gas density control system of the present invention allows airships to have greater payload lifting force by using the hydrogen within a fire proof helium fill envelope. Controlling the selective rotation of the storage tank 14 will allow precise adjustment of the ballonet's volume.

The ballonet 12 is preferably fabricated of light weight strong flexible material like Mylar or other polyester film conventionally used in high altitude research balloons. The shape and contours of the ballonet 12 depends on the shape of the airship's gas envelope. The shape and placement of this hybrid ballonet and storage tank system will greatly aid in trimming the attitude and altitude of the airship.

There are only two openings in the ballonet 12: The gas purge valve 13 at the very top of the ballonet 12 and the connection to the gas transfer hose 20, which is typically along an edge of the ballonet 12 adjacent the control unit 22. The hose may be of light weight, gas tight and flexible polyester fabricated much like a floor vacuum cleaner hose. It may contain a wire coil along its full length to allow the free flow of gas unaffected by temperature or pressure changes from ballonet 12 to storage tank 14. The opposite end of the hose 20 connected to a chamber/channel 60 in the hose reel. The channel 60 allows gas to flow from the hose 20 into the impeller 26 while the hose 20 is wrapped around the reel 34. The impeller 26 increases the rate of gas flow to or from the storage tank 14 and ballonet 12 when the tank gate valve 30 is open. Most of the connections between the various parts of the system can be glued.

The system of the invention enables one to trim and regulate the lifting capacity of the airship without the use of complicated gas manifolds and heavy pumps or high pressure valves, and without the necessity for dumping any valuable gases. The closable loop system of the invention is low pressure and uses no pumps to change lift gas density or volume. It is efficient and economical in that it entails no loss of gases. Furthermore, it enables the safe and effective use of hydrogen as a lift gas. This mechanical system is scalable to the size, volume, and shape of any airship's lifting gas envelope. In cases of emergence where power is lost, the system may also be operated manually by employing the gas purge valve 13.

It should be understood, of course, that the foregoing relates to exemplary embodiments of the invention and that modifications may be made without departing from the spirit and scope of the invention as set forth in the following claims.

What is claimed is:

1. A device, comprising:
    a drive motor;
    a lift air storage tank rotatably connected to the drive motor; and
    a ballonet extending from a base and a top edge, wherein the base is connected along an exterior surface of a length of the lift air storage tank so that a major portion of the ballonet wraps or unwraps directly around the rotating lift air storage tank.

2. The device of claim 1, further comprising a transfer hose fluidly connecting the ballonet and the lift air storage tank.

3. The device of claim 2, further comprising a hose reel rotatably connected to the drive motor, wherein the hose reel is adapted so that the transfer hose winds about the hose reel when the ballonet wraps around the rotating lift air storage tank.

4. The device of claim 3, wherein the hose reel provides a chamber fluidly connecting to the transfer hose and the lift air storage tank, and further comprising an impeller housed in the chamber.

5. The device of claim 1, further comprising a manual purge valve disposed along the top edge.

6. The device of claim 1, wherein the lift air storage tank has a curvilinear geometric shape.

7. A device, comprising:
    a drive motor;
    a curvilinear geometric shaped lift air storage tank rotatably connected to the drive motor;
    a ballonet extending from a base and a top edge, wherein the base is connected along an exterior surface of a length of the lift air storage tank so that a major portion of the ballonet wraps or unwraps directly around the rotating lift air storage tank;
    a transfer hose fluidly connecting the ballonet and the lift air storage tank;
    a hose reel rotatably connected to the drive motor, wherein the hose reel is adapted so that the transfer hose winds about the hose reel when the ballonet wraps around the rotating lift air storage tank;
a chamber fluidly connecting to the transfer hose and the lift air storage tank;
an impeller housed in the chamber; and
a manual purge valve disposed along the top edge.

* * * * *